United States Patent [19]

Gillespie et al.

[11] Patent Number: 4,467,763
[45] Date of Patent: Aug. 28, 1984

[54] IGNITION TIMING CONTROL FOR INTERNAL COMBUSTION ENGINES

[75] Inventors: John W. Gillespie, Chelsea; Mark L. Haddox, Ann Arbor, both of Mich.

[73] Assignee: Jodon Engineering Associates, Inc., Ann Arbor, Mich.

[21] Appl. No.: 416,848

[22] Filed: Sep. 13, 1982

[51] Int. Cl.³ .................. F02P 5/04; G01M 15/00
[52] U.S. Cl. ...................... 123/414; 73/116; 364/431.05; 364/571
[58] Field of Search ............ 123/414, 416, 480, 486; 73/116, 117.3; 364/431.05, 431.11, 431.12, 571

[56] References Cited

U.S. PATENT DOCUMENTS

| | | |
|---|---|---|
| 3,589,177 | 6/1971 | Merlo .................................. 73/116 |
| 3,703,825 | 11/1972 | Merlo .................................. 73/116 |
| 4,213,429 | 7/1980 | Douaud et al. . |
| 4,243,007 | 1/1981 | Ehrhardt et al. . |
| 4,244,023 | 1/1981 | Johnson . |
| 4,265,211 | 5/1981 | Meloeny . |
| 4,331,029 | 5/1982 | Wilson . |
| 4,366,541 | 12/1982 | Moori et al. ................. 123/486 X |
| 4,384,480 | 5/1983 | Krage et al. ....................... 73/116 |
| 4,407,155 | 10/1983 | Sundeen ............................ 73/116 |
| 4,433,572 | 2/1984 | Sundeen ............................ 73/116 |

Primary Examiner—Tony M. Argenbright
Attorney, Agent, or Firm—Barnes, Kisselle, Raisch, Choate, Whittemore & Hulbert

[57] ABSTRACT

An engine ignition timing control system and method wherein a timing module associated with a given engine includes a read only memory and circuitry for generating information related to engine crankshaft rotation. The module memory is programmed with information relating piston position to crankshaft rotation. The crankshaft rotation and piston position information is made available to an on-board ignition computer for precise control of ignition angle. Also disclosed are a system and method for separately programming the module memory associated with each engine as a function of the piston mechanics of that engine.

13 Claims, 7 Drawing Figures

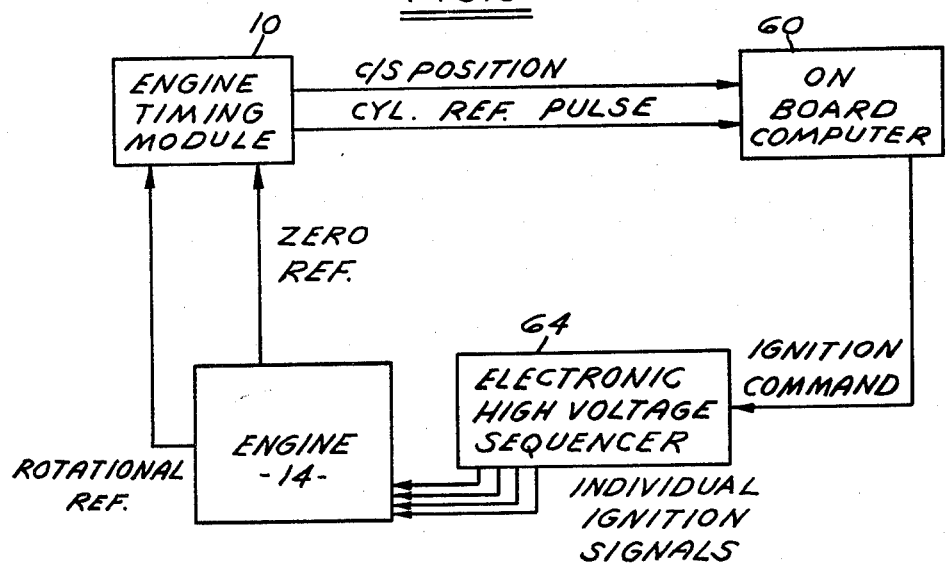
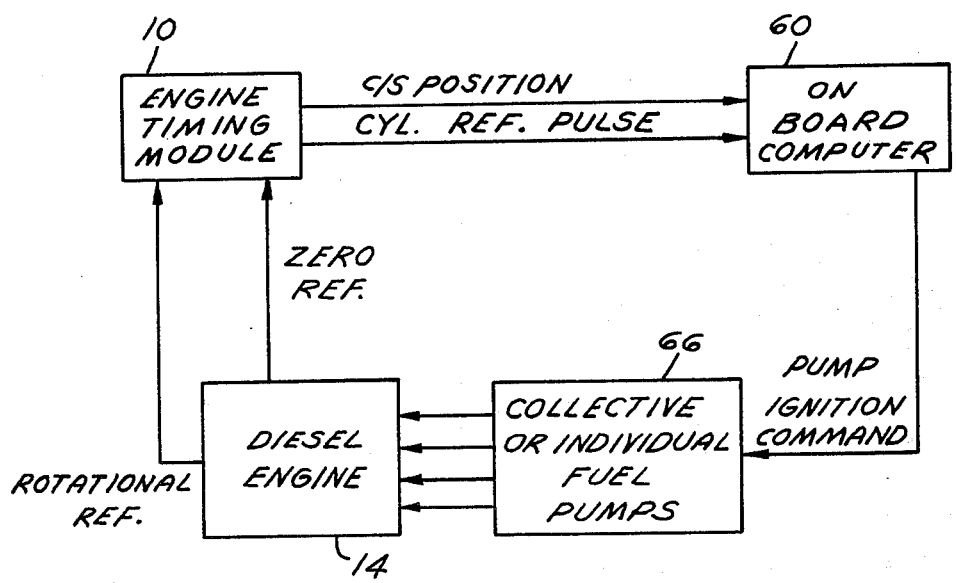

IGNITION TIMING CONTROL FOR INTERNAL COMBUSTION ENGINES

The present invention relates to ignition control for internal combustion engines, and more particularly to a system and method for controlling the timing of ignition events in each cylinder of a multiple-cylinder engine as a function of cylinder and piston mechanics.

BACKGROUND OF THE INVENTION

Ignition timing in an internal combustion engine is typically controlled by a member of some type, such as a cam or distributor rotor, rotatably coupled to the engine crankshaft. In a multiple-cylinder engine for passenger car use, for example, the mechanical tolerances of the piston and crankshaft drive train may be controlled employing conventional technology such that piston motion may typically be located within 0.1° of nominal. However, the tolerances of the rotating member and means such as cam switches or distributor points responsive thereto cannot readily be so closely controlled. Consequently, attempts at precise control of ignition timing to within tenths of a degree of crankshaft rotation and piston position have not been entirely successful.

It has been found desirable for many purposes to attempt control of ignition events with respect to the socalled piston top dead center or TDC position. Engine emissions and fuel efficiency, as well as ease of starting, depend in part upon initiating ignition at a precise point with respect to piston position within the associated cylinder. However, actual piston position typically is not directly determined. Rather, an indirect indication of piston position is derived from a rotating member coupled to the crankshaft, so the ignition timing accuracy is necessarily limited by the resolution capabilities of the rotating member and accuracy with which the rotating member is coupled to the crankshaft.

Timing of an engine often requires manual adjustment by an operator, as well as human judgemental considerations. For example, an operator may be expected manually to rotate a distributor housing while observing a mark or scribe line on the engine flywheel, harmonic balancer or camshaft pulley as illuminated by a strobe light. The mark on the flywheel may or may not be fairly accurately related to piston position. Such judgemental factors may easily lead to errors on the order of degrees. Additionally, the manual adjustment of the distributor is conducive to error, tampering and failure during operation.

OBJECTS AND SUMMARY OF THE INVENTION

A general object of the present invention is to provide a system and method for controlling the timing of ignition events in an internal combusion engine, particularly a multiple-cylinder engine, which alleviate or overcome the aforementioned problems and disadvantages in the prior art.

More specifically, an object of the invention is to provide a system and method of the described type in which the timing of ignition events may be related directly and accurately to piston position in the various cylinders.

Yet another and more specific object of the invention is to provide an electronic apparatus which may be included as a module in an overall ignition timing system for providing the capability of controlling ignition as an accurate and variable function of piston position, and also to provide a technique for programming each such module to reflect the piston mechanics of the particular engine with which the module is associated.

A further object of the invention is to provide a system and method of the described type which may selectively control ignition events in both gasoline and diesel engines.

Another object of the invention is to provide an engine ignition system which is particularly well adapted for rapid and accurate service-testing of ignition timing, and to provide an economical timing meter for testing such ignition timing.

Briefly stated, in accordance with a first important aspect, the invention contemplates a modular electronic control device or circuit which is adapted to be programmed to provide ignition timing control signals as a function of piston position, and a system and method for programming each said circuit module as a function of the specific engine with which it is to be associated. In the preferred form of the invention, the circuit module includes an electronic memory which is programmed with specific information relating piston position to crankshaft rotation for a particular engine. The module is programmed by operating the engine in a test or program mode, accurately measuring piston position as a function of crankshaft rotation, and storing suitable information in module memory. Most preferably, piston position is monitored using microwave measurement techniques while the engine is motored, and information is stored in module memory relating piston TDC to crankshaft position. Accuracies on the order of 0.1° are obtained.

In accordance with a second important aspect of the invention, the electronic module programmed per the above remains associated with the engine as part of an on-board ignition timing control system. In its most rudimentary form, the module may be programmed to generate a signal a predetermined number of degrees ahead of TDC for each piston, and the ignition control system may simply distribute this signal as an ignition command among the cylinders. More preferably, the ignition timing system includes, in addition to the programmed module, an onboard computer or other separate control circuitry for receiving crankshaft position signals from a transducer mounted on the engine and cylinder reference pulses from the programmed timing module, and for suitably controlling ignition timing as a function of these and other parameters. Various embodiments of the system and method of the invention are adapted for ignition control in gasoline and diesel engines.

A third aspect of the invention contemplates a timing meter which is adapted to be connected to the on-board computer in test or service applications for accurately indicating ignition angle.

BRIEF DESCRIPTION OF THE DRAWINGS

The invention, together with additional objects, features and advantages thereof, will be best understood from the following description, the appended claims and the accompanying drawings in which:

FIGS. 2-4 are functional block diagrams of engine timing systems employing a module programmed per FIG. 1 in accordance with respective embodiments of a second aspect of the invention;

DETAILED DESCRIPTION OF PREFERRED EMBODIMENTS

The preferred embodiments of the systems and methods of the present invention employ many details and principles which are disclosed in detail in the earlier patent to Scott E. Wilson, U.S. Pat. No. 4,331,029. This patent is assigned to the assignee hereof, and the disclosure thereof is incorporated herein by reference.

Figure 1:
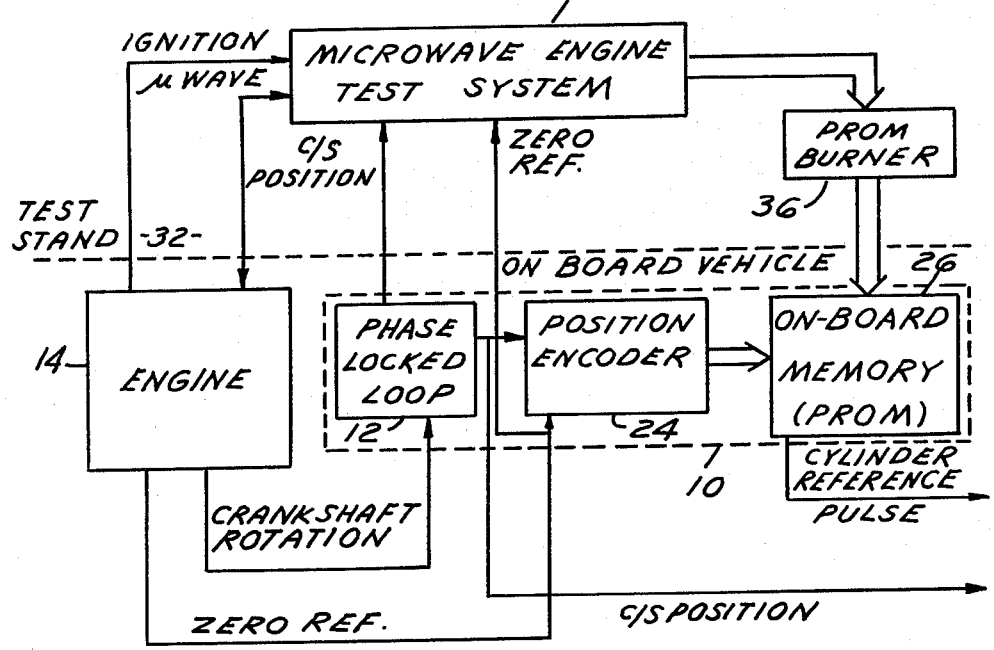
FIG. 1 is a functional block diagram of a programmable engine timing module and of a system for programming such module in accordance with one important aspect of the present invention.

Referring to FIG. 1, an electronic control module 10 in accordance with the invention is illustrated as comprising a phase locked loop 12 operatively coupled by a suitable transducing element to the crankshaft of an engine 14 for providing a periodic series of pulsed signals accurately related to crankshaft position. This may be acomplished, for example, by fixedly positioning an electromagnetic pickup 18 (FIG. 5) adjacent to the starting ring gear 20 mounted on the engine crankshaft 22. Other devices, such as an optical disc or the like, could be employed. At least some of the cooperative transducing elements must be mounted in permanent position relative to crankshaft angle since any repositioning would require reprogramming of the timing module. Most preferably, the crankshaft or c/s position output signal from phase locked loop 12 has a resolution of 0.1°. The crankshaft position signal is fed within timing module 10 to a position encoder 24 which may comprise a resettable modulo N counter for resolving each crankshaft revolution into N increments. Where the crankshaft position signal corresponds to 0.1° of crankshaft rotation, N equals 3600.

A programmable memory 26, such as a PROM, receives an address signal from position encoder 24 within timing module 10 and is programmed (in a manner to be described) to provide a cylinder reference pulse output signal indicative of actual position of each piston within the cylinders of associated engine 14. Most preferably, module memory 26 provides an output signal at a preselected crankshaft angle before TDC for each piston, such as at 20° ahead of each TDC position. Encoder 24 receives a zero reference pulse from the engine crankshaft for resetting the encoder once per revolution of the crankshaft. Such zero reference pulse may be developed from any suitable pair of transducing elements fixedly mounted on the engine with respect to crankshaft angle. For example, an extra bump or protrusion 28 on starter gear 20 (FIG. 5) may be sensed once per c/s revolution by a magnetic pickup 30. The cylinder reference pulse for each cylinder and the periodic signal indicative of crankshaft position are made available as a module output for control of engine ignition. The zero reference pulse may also be made available if desired.

A test stand 32 is employed for monitoring piston mechanics and initially programming on-board timing module 10. A microwave engine test system 34 is preferably employed which includes a probe for injecting microwave energy into a selected cylinder of the engine and suitable electronics for accurately identifying piston TDC as a function of resonances in the microwave signal. The microwave test system also receives the crankshaft position signal from phase locked loop 12 in the on-board timing module and the zero reference signal from transducer 28 (FIG. 5) for relating piston position and TDC to crankshaft rotation. Microwave engine test system 24 is disclosed in detail and is the subject of the above-referenced Wilson U.S. Patent, and reference is made thereto for a more detailed description of the preferred method of locating piston TDC in practice of the present invention. Although microwaverange radiation as specifically disclosed in Wilson is presently preferred, it is envisioned that radiation in other frequency ranges, such as x-ray or ultrasonics, may be used in appropriate circumstances while applying the Wilson technique for identifying TDC.

When the crankshaft angle corresponding to the TDC piston position in the cylinder under test has been identified with respect to the zero reference signal, a cylinder reference pulse for each cylinder may then be fed within test stand 32 to a suitable programming means, such as a PROM burner 36, for programming on-board module memory 26. Such signal may be 20° before TDC for each cylinder. Because the mechanical tolerances of an engine typically are such that angular relationships among the various cylinder TDC positions are accurate on the order of 0.1°, only one cylinder need be tested for each engine. It should be noted at this point that it is not necessary for programming the on-board timing module in accordance with the invention that the engine actually be operating. To the contrary, it is anticipated that cold motoring of engine 14 from an external source (not shown) will be employed during the initial programming operation. Indeed, it is possible that a combination cold and hot test stand may be employed for first programming the on-board timing module while the engine is motored, and then testing and adjusting engine timing as required while the engine is actually fired.

Figure 5:
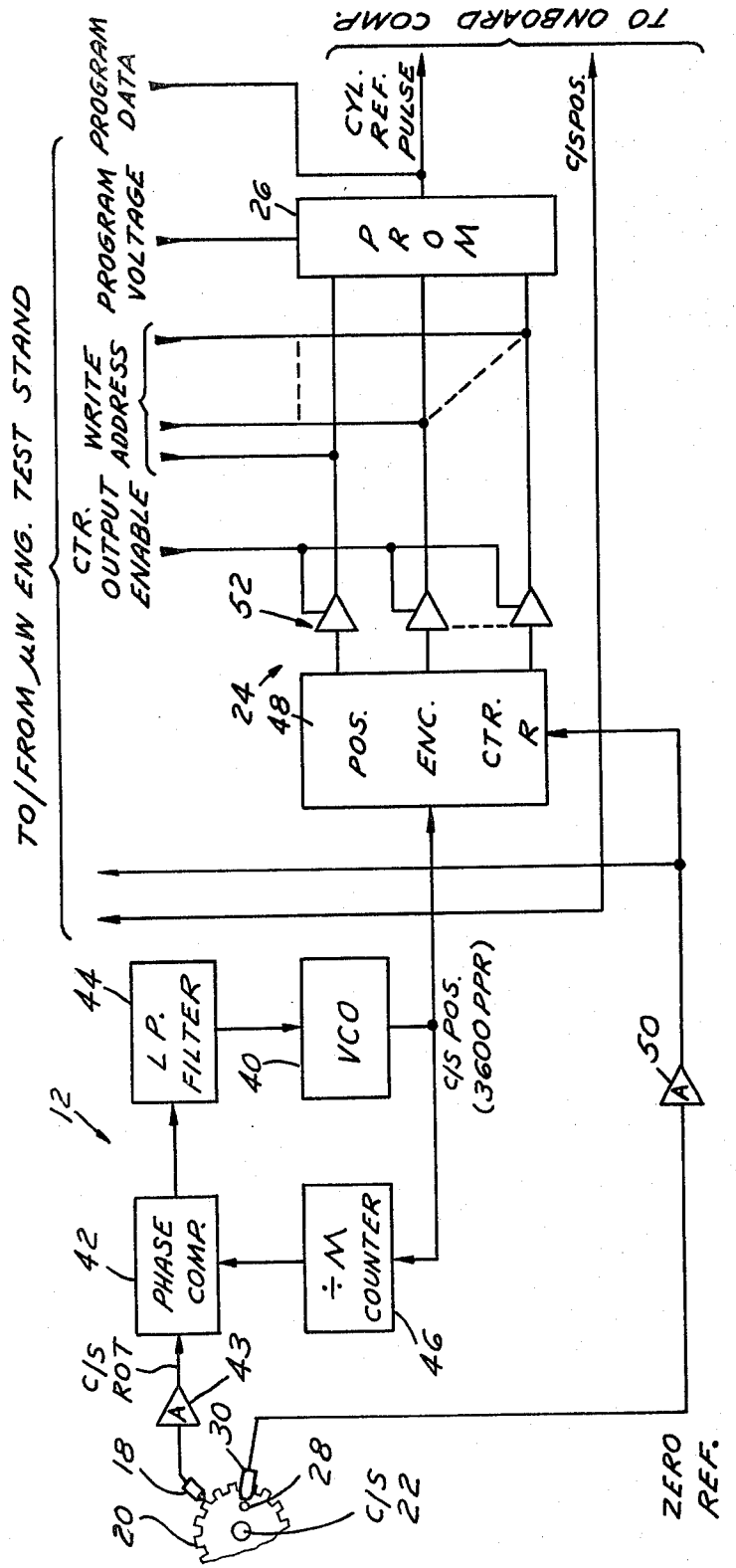
FIG. 5 is a more detailed functional block diagram of the engine timing module in accordance with a presently preferred embodiment of the invention.

FIG. 5 illustrates a presently preferred embodiment of on-board timing module 10 in greater detail. Phase locked loop 12 includes a voltage controlled oscillator 40 having an output frequency which is controlled by the output of a phase comparator 42 through a low pass filter 44. The output of oscillator 40 is fed to one input of phase comparator 42 through a divide-by-M or modulo M counter 46. The second input of phase comparator 42 receives the crankshaft rotation reference signal from pickup 18 through suitable buffer electronics 43. To obtain the desired 0.1° resolution, a VCO output frequency of 3600 pulses per crankshaft resolution is desirable. Counter 46 is set to match the desired VCO output frequency to the number of pulses available per revolution of starter gear 20.

Position encoder 24 includes a binary counter 48 which receives a count input from VCO 40 and a reset input from zero reference pickup 30 through suitable buffer electronics 50. The binary bit-parallel output of counter 48 is fed through respective gated buffer amplifiers 52 to the address inputs of PROM 26. The gating or enable inputs of amplifiers 52 are available for common connection to test stand 32. Likewise, the address inputs of PROM 26, the PROM program voltage input and the program data line are available for connection to PROM burner 36 in test stand 32. The c/s position output of VCO 40 and the zero reference output of buffer electronics 50 are likewise available for connection to test stand 32 and are previously described. All of these lines may be made available at a suitable connector to be connected by cable to test stand 32 as required.

During the programming mode of operation, test stand 32 is connected to on-board module 10 and engine 14 as shown in FIG. 1 and engine 14 is cold motored. Amplifiers 52 are disabled. Microwave engine test system 34 identifies the crankshaft angle of piston TDC for the engine under test in the manner disclosed in the referenced Wilson patent, and computes therefrom the TDC positions of the other cylinders. In a four cylinder engine, for example, two cylinders will have the TDC of the monitored cylinder and the other two cylinders will have TDC positions 180° displaced from that of the monitored cylinder. Microwave system 34 then identifies the crankshaft angles at which the cylinder reference pulses are to be generated, 20° ahead of each TDC in the example previously mentioned, and sequentially presents these angles at the address inputs of PROM 26. As each address is so presented, the desired logic state is presented at the program data line, and a program voltage is fed to the PROM to write or "burn" the program data at the addressed memory location.

When the programming operation is completed, amplifiers 52 are enabled and the output of counter 48 is presented to the address inputs of PROM 26. When the motored engine crankshaft rotates to the angular position corresponding to the programmed addresses of PROM 26, the cylinder reference pulses are generated at the PROM output. These pulses may be monitored by the test stand to insure proper operation. On-board module 10 is then ready for normal operation and engine 14 may proceed to "hot test" and timing as desired.

Thus, module 10 is programmed in accordance with a first aspect of the invention to provide signals as a preselected function of actual piston position in each cylinder when the appropriate crankshaft angular "address" is received from the module position encoder. The module is uniquely and separately programmed in association with a corresponding engine and is intended to remain associated with that engine during the operating lifetime of that engine. Only in the event of loss of the module, damage to or tampering with the crankshaft transducer elements, or major overhaul of the engine need the module be replaced or reprogrammed. Most preferably, the programmed portion of the module, i.e. PROM 26, is physically separable from the remainder so that, in the event of failure of or damage to some portion of the latter, the programmed PROM may be removed from the failed module, placed in a new module and thereafter continue in operation.

Figure 2:
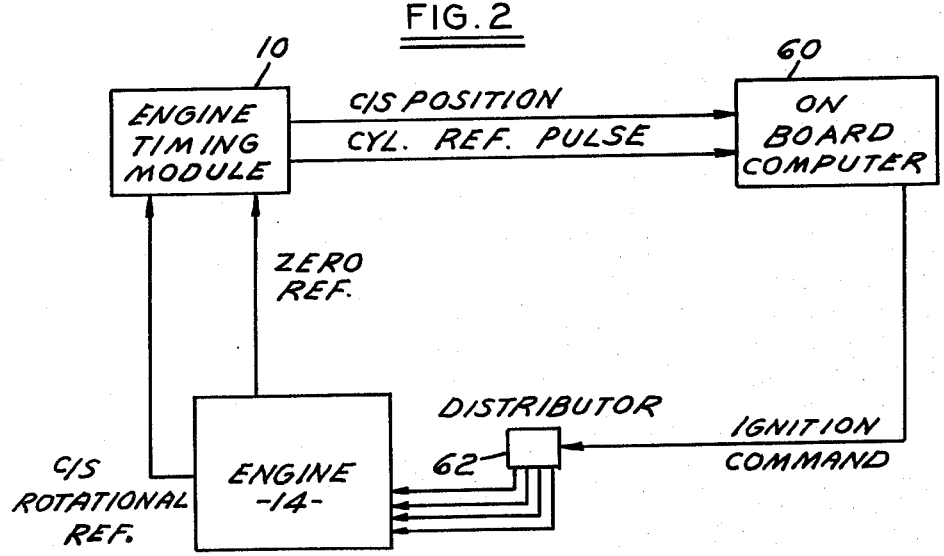

In accordance with a second important aspect of the invention, on-board timing module 10, programmed as per the above, is connected within a system for continuously controlling engine ignition as a function of piston position in each cylinder. This timing system (FIGS. 2–4) includes a suitable on-board computer 60 for receiving the crankshaft position reference signal and cylinder reference pulses from the timing control module. The on-board computer may also receive inputs from other sources (not shown) for controlling ignition timing as any desired function of other engine or fuel parameters. Such parameters may typically include engine temperature, emissions, exhaust $O_2$, load, RPM, air temperature, "knock", etc. Computer 60 relates the crankshaft position, via the crankshaft position signals, to the actual piston positions, via the cylinder reference pulses, and to the other input indicia, and then provides an ignition command at a selected point in the piston operating cycle—i.e. at an optimum ignition angle with respect to TDC.

For example, if conditions indicate that ignition at an angle of 7.3° ahead of TDC is desirable, and if the cylinder reference signals occur 20° ahead of TDC and the c/s position signal is at 3600 ppr as in the examples previously mentioned, on-board computer 60 may simply count 127 pulses (12.7°) after each cylinder reference and initiate an ignition command. If conditions thereafter change and indicate an optimum ignition angle of 6.8° ahead of TDC, for example, computer 60 may count 132 pulses (13.2°) after each cylinder reference pulse. (Various techniques for identifying desired ignition angle based upon various conditions are proposed elsewhere in the art and are not part of the present invention.) The ignition command signals generated by computer 60 may be fed to a mechanical distributor 62 (FIG. 2) or to solid state sequencer or distributor 64 (FIG. 3) in the case of multiple-piston gasoline engines, or to collective or individual fuel injection pumps or valves 66 (FIG. 4) in the case of a diesel engine.

Although it is not necessary for computer 60 to receive the zero reference pulse to generate the ignition command using the technique previously described, it may be desirable to make this signal available to computer 60 for other purposes. This may be desirable, for example, where the on-board computer must track which of the two cylinders associated with a given cylinder reference pulse is going to be fired.

Figure 6:
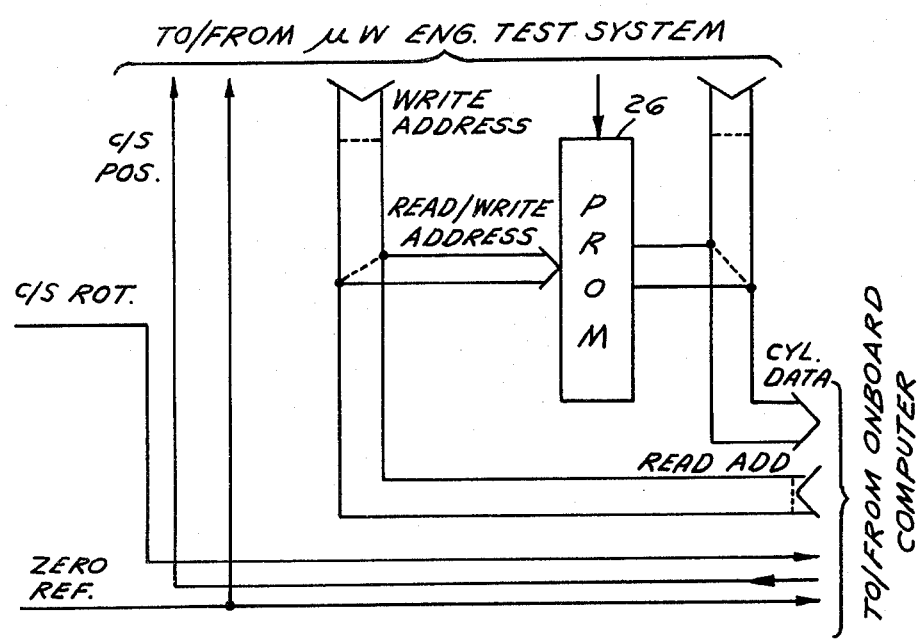
FIG. 6 is a functional block diagram of an alternative embodiment of the engine timing module of FIGS. 1 and 5.

Another potential modification to the on-board timing module of the invention is illustrated in FIG. 6. In this modification, phase locked loop 12 and position encoder 24 (FIGS. 1 and 5) of the preferred embodiment are incorporated into the on-board computer (not shown) and, thus, eliminated from the module itself. PROM 26 does not store cylinder reference pulses in this modification, but stores the crankshaft rotation addresses of the cylinder reference pulses. Thus, the on-board computer may read these addresses each time the engine is started, and store this information internally. Of course, the zero reference pulse must be fed to the on-board computer in this modification. PROM 26 in the modification of FIG. 6 remains associated with its specific engine, which raises the possibility that other information unique to that engine could also be stored in the PROM and read by the on-board computer as desired.

Figure 7:
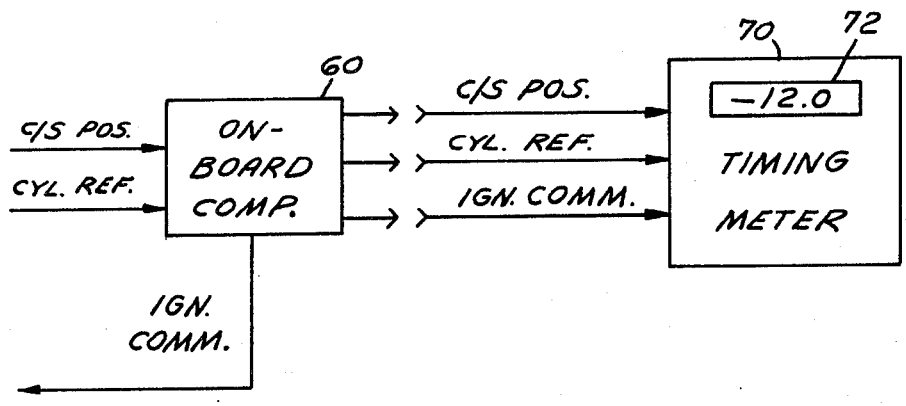
FIG. 7 is a block diagram showing an engine timing meter useful in combination with the system and method of the invention.

FIG. 7 illustrates another feature of the invention whereby on-board computer 60 has an output connector at which the crankshaft position signal, the cylinder reference pulses and the ignition command signals are available. A timing meter 70 may be plugged into computer 60 to measure ignition timing from the available signals. Meter 70 may include a resettable downcounter responsive to a cylinder reference pulse to set the counter to a figure corresponding to the angle ahead of TDC, 20° or a count of 200 in the aforementioned examples. The counter may then be decremented by each c/s position pulse until occurrence of the ignition command, at which point the ignition angle will be available at the counter output. This angle may then be stored in a register and displayed in decimal form as at 72.

If the c/s position signal does not contain exactly 3600 pulses per c/s revolution, meter 70 may also include electronics to measure the number of crankshaft position pulses per cylinder reference pulse, and, given the total number of engine cylinders, convert into degrees and tenths of a degree any measurement obtained by the method described above.

During the programming mode of operation of the system and method disclosed herein, the engine would normally be cold motored. However, during the programming mode, the engine could be operated under its own power at an approximately correct timing value via temporary use of a programmed module and ignition control computer, both of which are associated with the test stand instead of the engine.

The invention claimed is:

1. A method of controlling ignition timing in an internal combustion engine comprising at least one cylinder having a piston disposed to reciprocate therein and an engine crankshaft rotatably coupled to said piston, said method comprising the steps of:
   (a) monitoring rotation of said crankshaft,
   (b) measuring actual position of said piston within said cylinder as a function of rotation of said crankshaft,
   (c) storing information obtained in said step (b) relating actual piston position to crankshaft rotation, and thereafter
   (d) initiating ignition at said cylinder as a conjoint function of monitored crankshaft rotation in step (a) and said information stored in said step (c).

2. The method set forth in claim 1 wherein said step (b) is performed by injecting microwave radiation into said cylinder, detecting resonances of said microwave radiation as said piston reciprocates within said cylinder and identifying top dead center position of said piston within said cylinder from said resonances.

3. The method set forth in claim 1 wherein said step (b) is performed by injecting radiation into said cylinder, identifying a predetermined position of said piston within said cylinder as a function of variations in said radiation as said piston reciprocates within said cylinder, and correlating said predetermined piston position with crankshaft rotation to identify a crankshaft angle associated with said piston position.

4. The method set forth in claim 3 wherein said step (c) comprises the step of providing an electronic memory associated with said engine and storing in said memory information indicative of said crankshaft angle associated with said piston position.

5. A method of programming a plurality of internal combusion engines for electronic ignition control as a function of individual mechanical characteristics of each said engine, each said engine comprising at least one cylinder having a piston disposed to reciprocate therein and a crankshaft rotatably coupled to said piston, said method comprising the steps of:
   (a) providing each said engine with an associated electronic module which includes at least a programmable electronic memory,
   (b) monitoring crankshaft rotation while rotating each said crankshaft,
   (c) measuring actual piston position within said cylinder in each said engine as a funtion of rotation of the associated said crankshaft,
   (d) identifying a predetermined position of each said piston within the associated said cylinder,
   (e) correlating said predetermined position of each said piston with an associated crankshaft rotation angle, and
   (f) storing each said crankshaft rotation angle on the said electronic memory associated with the corresponding said engine, such that each of said plurality of engines has associated therewith a corresponding said module having stored therein information relating crankshaft angle to a predetermined piston position, said predetermined piston position being the same for all said engines.

6. The method set forth in claim 5 wherein said step (d) is accomplished by injecting radiation into said cylinder on each said engine and identifying each said predetermined piston position as a function of variations in said radiation as the associated said piston reciprocates within said cylinder.

7. The method set forth in claim 5 wherein said predetermined position is top dead center of each said piston in the associated said cylinder.

8. The method set forth in claim 7 wherein said step (f) comprises a step of storing in each said electronic memory information indicative of a predetermined angle prior to the associated said top dead center piston position, said predetermined angle being the same for all of said engines.

9. The method set forth in claim 1, 4 or 5 wherein each said engine comprises a multiple-cylinder engine, and wherein said method includes the steps of measuring said piston position and storing information related thereto for only one said cylinder in each engine, and obtaining the corresponding information for the remaining cylinders in each engine as a function of mechanical characteristics of said engine.

10. A system for controlling ignition in an internal combustion engine having at least one cylinder with a piston disposed to reciprocate therein and a crankshaft rotatably driven by said piston, said system comprising means rotatably coupled to said crankshaft for monitoring angular rotation of said crankshaft, an electronic module including memory means having stored therein information relating actual piston position to crankshaft rotation, and means responsive to angular rotation of said crankshaft and to said stored information for initiating an ignition event at said cylinder at a first predetermined position of said piston with respect to piston top dead center.

11. The system set forth in claim 10 wherein said memory comprises a read only memory having said information prestored therein.

12. The system set forth in claim 11 wherein said module further comprises encoder means responsive to angular rotation of said crankshaft for continuously indicating crankshaft angular position, said read only memory having an address input coupled to said encoder means and an output which provides a reference signal at a predetermined crankshaft position corresponding to a second predetermined piston position, said ignition initiating means comprising means responsive to said angular rotation of said crankshaft and to said reference signal for initiating said ignition event.

13. The system set forth in claim 12 wherein said second predetermined piston position comprises a predetermined position ahead of top dead center measured in units of angular rotation at said crankshaft.

* * * * *